United States Patent [19]
Endo

[11] Patent Number: 5,327,350
[45] Date of Patent: Jul. 5, 1994

[54] INTERACTIVE TYPE NUMERICAL CONTROL APPARATUS AND METHOD THEREOF

[75] Inventor: Takahiko Endo, Minamitsuru, Japan

[73] Assignee: Fanuc Ltd., Minamitsuru, Japan

[21] Appl. No.: 861,811

[22] PCT Filed: Nov. 6, 1991

[86] PCT No.: PCT/JP91/01523

§ 371 Date: Jun. 18, 1992

§ 102(e) Date: Jun. 18, 1992

[87] PCT Pub. No.: WO92/09020

PCT Pub. Date: May 29, 1992

[30] Foreign Application Priority Data

Nov. 16, 1990 [JP] Japan .................. 2-310712

[51] Int. Cl.⁵ .................. G06F 15/46; G05B 19/18
[52] U.S. Cl. .................. 364/474.21; 364/474.14;
364/474.26; 483/11
[58] Field of Search ......... 364/474.21, 474.22–474.27,
364/474.02, 191–193, 474.14; 318/568.1;
407/114–116; 483/4–12

[56] References Cited

U.S. PATENT DOCUMENTS

| | | | |
|---|---|---|---|
| 4,033,206 | 7/1977 | Morita et al. | 364/474.21 X |
| 4,530,046 | 7/1985 | Munekata et al. | 364/474.25 X |
| 4,549,270 | 10/1985 | Fukumura et al. | 364/474.21 |
| 4,750,105 | 6/1988 | Ohkawa et al. | 364/474.21 X |
| 4,761,844 | 8/1988 | Turchan | 408/222 X |
| 4,778,313 | 10/1988 | Lehmkuhl | 408/3 X |
| 4,794,514 | 12/1988 | Hideaki et al. | 364/474.21 X |
| 4,992,008 | 2/1991 | Pano | 364/474.02 |
| 5,172,327 | 12/1992 | Miyata et al. | 364/474.21 |

FOREIGN PATENT DOCUMENTS 58-155101 9/1983 Japan .
58-181107 10/1983 Japan .

Primary Examiner—Joseph Ruggiero
Attorney, Agent, or Firm—Staas & Halsey

[57] ABSTRACT

An interactive type numerical control apparatus having an interactive type data input function for controlling the operation of a machine tool by creating a machining program based on input data. A composite tool (3) able to carry out a plurality of different machining operations is selected and an NC sentence is created based on data input designating the tool path of the composite tool (3). With this arrangement, a plurality of different numerically controlled NC machining operations can be effectively executed by the composite tool (3).

6 Claims, 3 Drawing Sheets

INTERACTIVE TYPE NUMERICAL CONTROL APPARATUS AND METHOD THEREOF

TECHNICAL FIELD

The present invention relates to an interactive type numerical control apparatus, and more specifically, to an interactive type numerical control apparatus by which a machining configuration for a composite tool capable of carrying out a plurality of different machining operations can be designated.

BACKGROUND ART

An interactive type numerical control apparatus designates a tool in accordance with a created machining program, and outputs a command to a machine tool for sequentially machining a raw material. When this machining program is created, different machining operations, such as bar machining, trace machining, fillet machining, face machining, screw machining, groove machining and the like, are selected and the tools and cutting conditions are automatically determined based on input data.

Accordingly, tools and cutting conditions optimum for the different machining operations for the raw material are designated, to thereby shorten a machining cycle time and obtain a more effective operation of the machine tool.

Recently, a tool capable of performing a plurality of different machining operations has been developed, and an effective operation of such a machine tool further shortens the machining cycle time. For example, a Cut-Grip (Trade Mark) tool having a composite function with cutting blades at both the front and side, for arbitrarily effecting a cutting operation in any direction, can perform an outside diameter machining, face machining, trick machining and inside diameter machining, without changing the tool.

When a cutting operation and groove machining operation are performed by using a tool having such composite functions, without changing the tool, a time necessary for changing the tool is further reduced and the programming therefore can be simplified.

Further, in general, when a machining program including an outside diameter cutting operation and a groove machining operation is created by an interactive type numerical control apparatus, configuration data for each of the two operations is input in accordance with a different set screen.

Nevertheless, when data is input through a different set screen each time a type of machining is changed in the creation of a program effected by using an interactive type numerical control apparatus, the program cannot be effectively created. Further, unless a machine tool is operated in accordance with a machining program that makes the best use of the features of the tool having a composite function, a cycle time cannot be always shortened.

Also, preferably when a composite tool is not fitted as the machine tool, the same machining can be realized by using conventional tools with a single cutting blade.

SUMMARY OF THE INVENTION

Taking the above into consideration, an object of the present invention is to provide an interactive type numerical control apparatus having an interactive type program creating function dedicated to a tool with a composite function and able to effectively operate a machine tool by a created machining program.

To attain the above object, according to the present invention, there is provided an interactive type numerical control apparatus having an interactive type data input function for controlling the operation of a machine tool by creating a machining program based on input data, which comprises a tool selection means for selecting a composite tool able to carry out a plurality of different machining operations and an NC sentence creation means for creating an NC sentence based on data designating a tool path of the composite tool.

Accordingly, data conventionally input by using a plurality of interactive screens can be input by using only a single screen, and further, a plurality of different NC machining operations can be effectively executed by the composite tool.

DETAILED DESCRIPTION OF THE INVENTION

An embodiment of the present invention will be described below with reference to the drawings.

Figure 1:
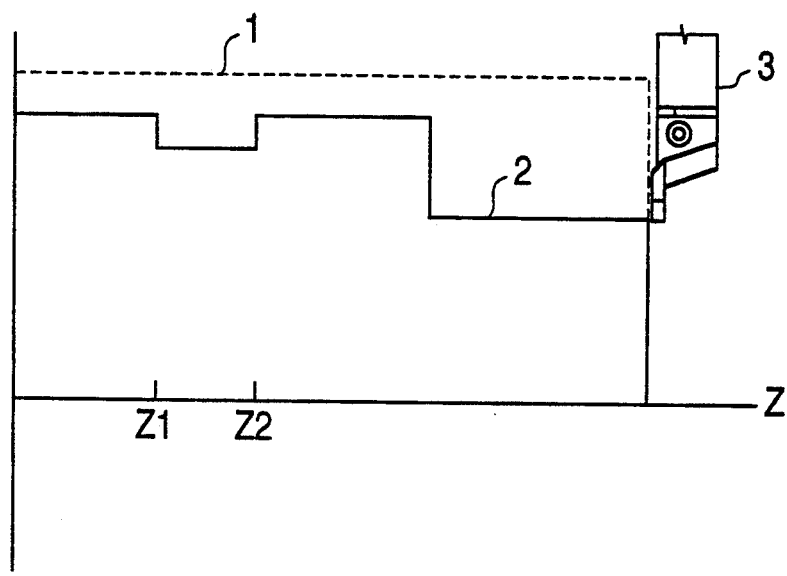
FIG. 1 is a diagram showing an example of a screen for creating an interactive type program dedicated to a tool having a composite function.

FIG. 1 is a diagram showing an example of a screen for creating an interactive type program dedicated to a tool having a composite function.

A raw material configuration 1 is shown by a dotted line at an input screen dedicated to a composite tool selected from a screen for selecting a type of machining operation. After the selection of a profile configuration, an operator inputs data through a keyboard in accordance with a machining drawing, and accordingly, a machining configuration 2 is drawn on the screen. The raw material configuration 1 is composed of a round bar having a groove configuration of a predetermined depth, input from the position Z1 to the position Z2 in a Z-axis direction. Here, a Cut-Grip 3 is shown as the composite tool.

The cutting configuration and the groove configuration simultaneously designated for the raw material configuration 1 are then input to create NC data.

Figure 2:
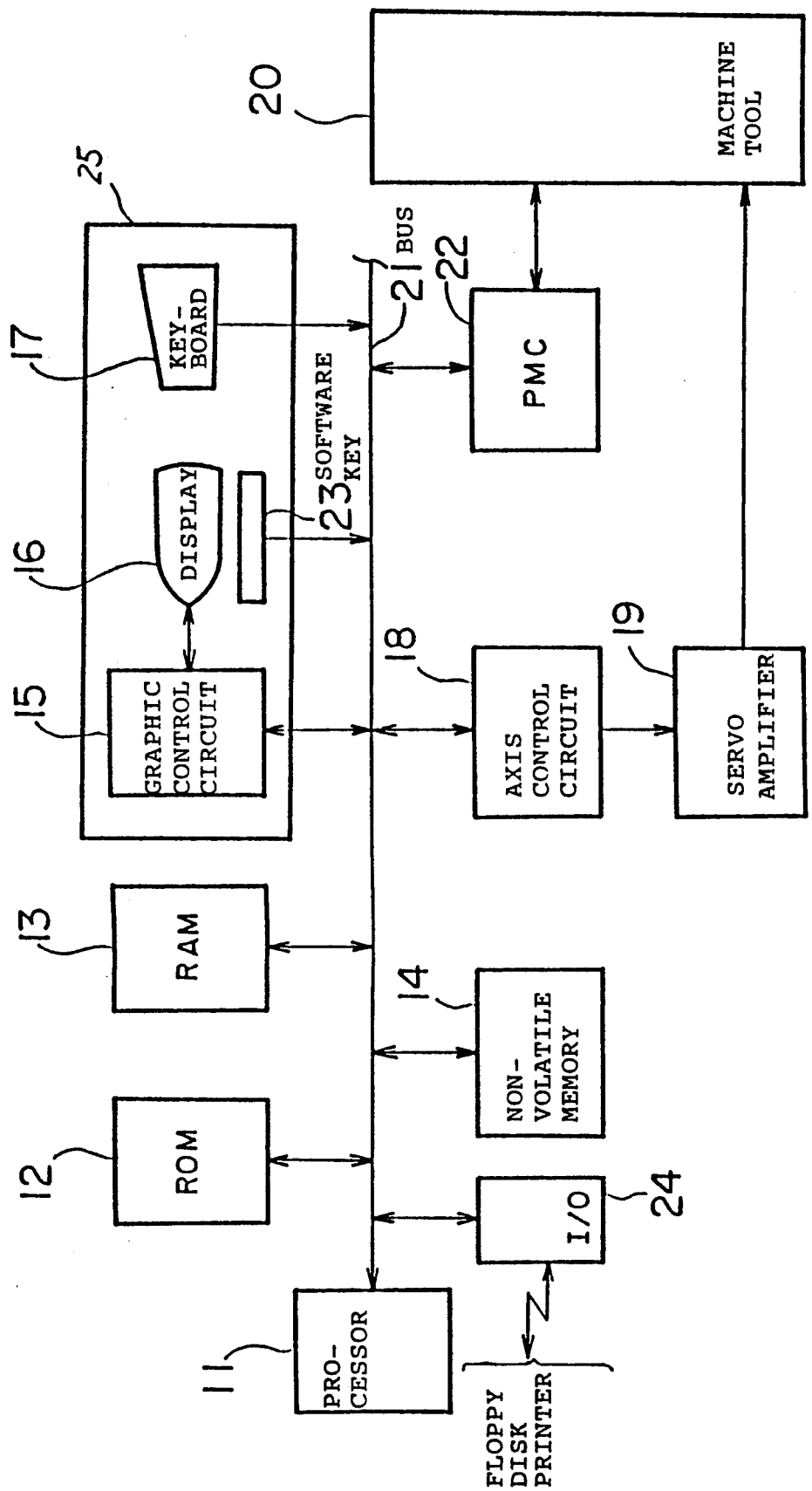
FIG. 2 is a block diagram showing an example of an interactive type numerical control apparatus according to the present invention.

FIG. 2 is a block diagram showing an example of an interactive type numerical control apparatus according to the present invention.

A processor 11 controls the numerical control apparatus as a whole, in accordance with a system program stored in a ROM 12. The ROM 12 is an EPROM or EEPROM in which input screens and the like of interactive type data are stored. A RAM 13 is a SRAM or the like in which various interactive data or I/O signals are stored. A non-volatile memory 14 is composed of a CMOS supplied with power from a battery and stores data to be maintained even after a power supply to the numerical control apparatus is cut off, for example, parameters, amounts of pitch error and tool correction and the like, in addition to created NC sentences.

A graphic control circuit 15 converts digital signals into signals for display, and supplies those signals to a display 16. A CRT or liquid crystal display is used as the display 16, to display configurations, machining conditions, created machining programs and the like, when a machining program is created by an interactive mode.

A keyboard 17 is composed of symbolic keys, numerical keys and the like, and necessary graphic data and NC data are input by using these keys.

An axis control circuit 18 receives an axis movement command from a processor 11 and outputs the same to a servo amplifier 19, and upon receiving the axis movement command, the servo amplifier 19 drives the servo motors of a machine tool 20. These components are interconnected through a bus 21.

When an NC program is executed, a programmable machine controller (PMC) 22 receives a T function signal (tool selection command) and the like through the bus 21, and the PMC 22 then processes this signal through a sequence program and outputs a signal as an operation command, to thereby control the machine tool 20. Further, the PMC 22 receives a state signal from the machine tool 20, sequentially processes same, and transfers a required input signal to the processor 11 through the bus 21.

Note that a software key 23 having a function which is changed by the system program and the like, and a serial interface 24 through which the NC data is transferred to an external device such as a floppy disk, printer, paper tape reader (PTR) and the like, are further connected to the bus 21. This software key 23 is provided with a CRT/MDI panel 25, together with the above display 16 and keyboard 17.

Jobs or data which can be set through the input screen are shown at the display 16 by using menus, and these menus are selected through the software key 23 disposed at the lower portion of the screen in correspondence with the menus. The software key 23 provides a different function for each screen. The input data is processed by the processor 11, to thereby create a workpiece machining program.

Figure 3:
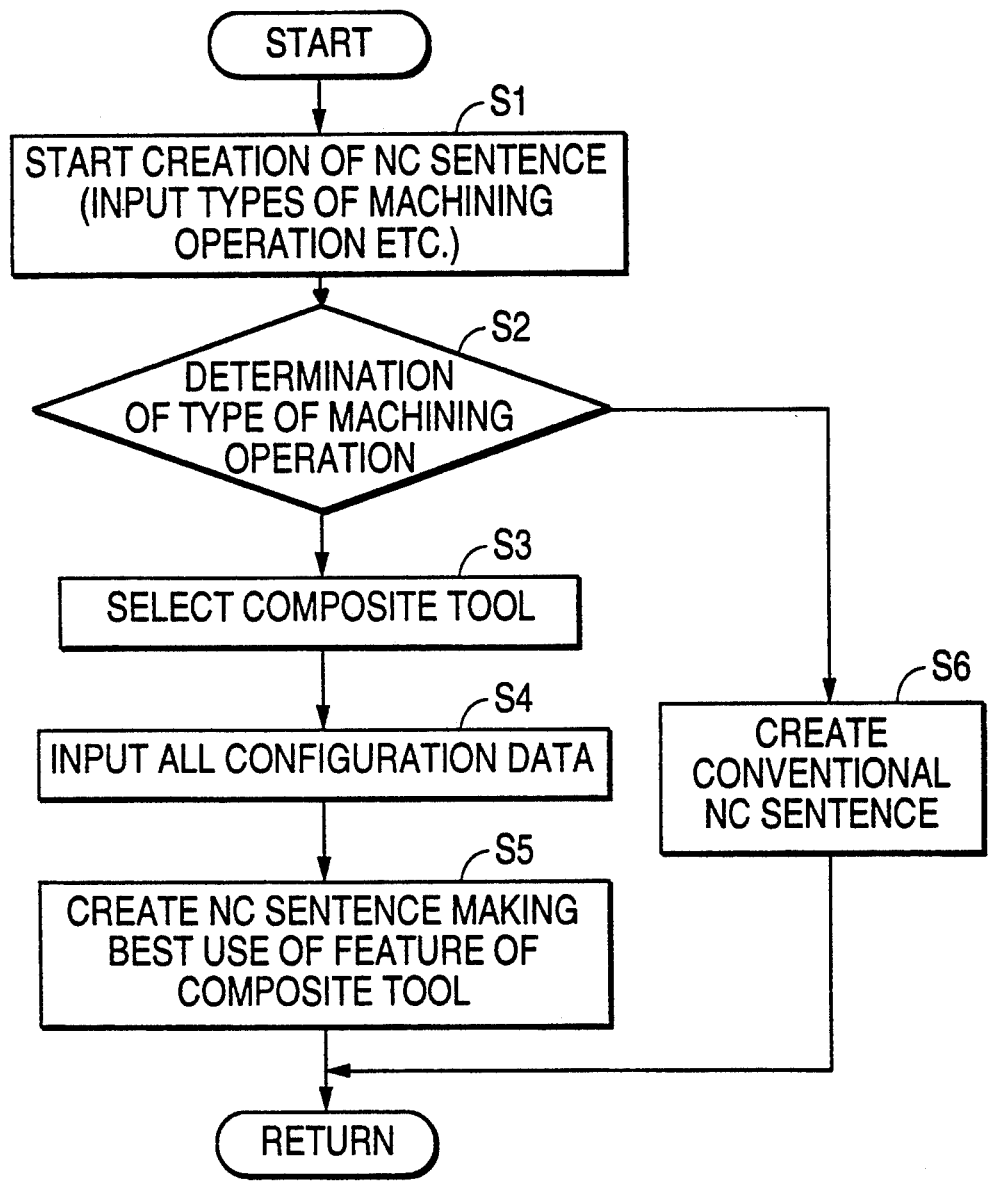
FIG. 3 is a flowchart of a processing of an interactive type numerical control apparatus according to the present invention.

FIG. 3 is a flowchart of processing of the interactive type numerical control apparatus according to the present invention, wherein numerals prefixed with an S indicate the numbers of the steps.

[S1] The creation of an NC sentence is initiated and a type of machining operation is displayed, at the display together with a kind and configuration of a raw material in the interactive type numerical control apparatus, from which a programmer selects a displayed item by an interactive mode.

[S2] It is determined whether or not a composite tool must be selected to execute a designated type of machining operation, and when the designated type of machining operation can use the composite tool, the flow goes to step S3. If not, the flow goes to step S6.

[S3] A usable composite tool is selected,

[S4] Configuration data is input to specify all machining configurations.

[S5] Data for designating a tool path of the composite tool is determined, and an NC sentence is created based on the data.

[S6] A usual tool is selected and a conventional NC sentence is created.

As described above, the data input is continued in an interactive mode until all NC sentences necessary for creating a machining program are created. At this time, when a plurality of tools carrying out the respective types of machining operations performed by the composite tool are selected, and at the same time, the tool paths thereof are created together with the tool path of the composite tool, these tools and tool paths are stored in the non-volatile memory 14, and thus the machining operation can be carried out even if an optimum composite tool is not fitted as the machine tool.

When the machining program is executed, each time a tool change is commanded, it is determined whether or not the tool to be selected is a composite tool, and when a composite tool is selected, the NC sentence as a machining program created in step S5 is executed. With this arrangement, a time necessary for changing the tools is reduced and the programs can be simplified.

As described above, according to the present invention, an interactive type program making the best use of the feature of a composite tool can be created.

Further, when a composite tool is selected as a machine tool, the machine tool can be effectively operated to thereby shorten a machining cycle time.

Furthermore, a machine tool can be controlled in the same way by a conventional NC sentence, without selecting a composite tool, and in this case the same machining operation can be achieved by usual tools.

I claim:

1. An interactive type numerical control apparatus having an interactive type data input function for controlling operation of a composite tool capable of performing a plurality of different machining functions on a workpiece attached to a turning machine and a turning machine tool capable of performing only one machining function on the workpiece, by creating a machining program based on input data, comprising:

tool selection means for selecting said composite tool to perform a machining function designated by a user when said composite tool is capable of performing said designated machining function, and for selecting said turning machine tool otherwise; and NC sentence creation means for creating an NC sentence based on data designating a tool path of said composite tool.

2. An interactive type numerical control apparatus according to claim 1, wherein when said composite tool is selected by said tool selection means, operation of said composite tool is controlled by retrieving said tool path of said composite tool from said NC sentence as a machining program.

3. An interactive type numerical control apparatus according to claim 1, further comprising:

a plurality of turning machine tools, each one of said plurality of turning machine tools capable of performing only one machining function;

a storage area; and said NC sentence creation means creating the tool path of said composite tool and tool paths of said turning machine tool and said plurality of turning machine tools carrying out respective types of machining functions and stores same in said storage area.

4. An interactive type numerical control apparatus according to claim 1, further comprising:

display means for simultaneously displaying a cutting configuration and a grooving configuration of the workpiece to be machined, and a machining configuration.

5. An interactive type numerical control apparatus having an interactive type data input function, a composite tool capable of performing a plurality of different machining operations on a workpiece attached to a turning machine, and a turning machining tool capable of performing only one machining operation on the workpiece, said interactive type numerical control apparatus comprising:

processing means;

display means for displaying machining conditions and created machining programs, and for simultaneously displaying a workpiece configuration and a machining configuration for the workpiece;

servo amplification means for driving servo motors of the composite tool and the turning machining tool;

axis control means for receiving an axis movement command from said processing means and outputting said axis movement command to said servo amplification means;

programmable machine control means receiving a tool selection command, for controlling the composite tool and the turning machining tool in response to said tool selection command;

interfacing means for transferring numerical control data to an external device;

software key means connected to said display means, having functions changed by a system program, for providing a different one of said machining operations for each screen displayed on said display means;

memory means for storing parameter data, configuration data, and created numerical control sentences indicating tool paths of one of said composite tool and said turning machining tool, said memory means maintaining said stored data even after a power supply to said interactive type numerical control apparatus is cut off; and selection means for making a determination whether one of said machining operations, input by a user, can be performed by said composite tool.

6. A method of controlling an interactive type numerical control apparatus having an interactive type data input function, a composite tool capable of performing a plurality of different machining operations on a workpiece attached to a turning machine, and a turning machine tool capable of performing only one machining operation on the workpiece, said method comprising:

initiating creation of a numerical control sentence and displaying a type of machining operation together with a kind and configuration of the workpiece on a single screen;

making a determination whether the composite tool may be used to perform one of the machining operations designated by a user;

selecting the composite tool if the composite tool may be used to perform said one of the machining operations;

inputting configuration data to specify all machining configurations is the composite tool may be used to perform said one of the machining operations;

designating a tool path of the composite tool and creating said numerical control sentence, if the composite tool may be used to perform said one of the machining operations; and selecting the turning machine tool and creating said numerical control sentence, if the composite tool may not be used to perform said one of the machining operations.

* * * * *